A. Havens,
Harrow.
No. 108,478.
Patented Oct. 18, 1870.

Abraham Havens
by his Attys.
Howson and Son

WITNESSES
Wm A. Steel
Jno B. Harding

United States Patent Office.

ABRAHAM HAVENS, OF TRENTON, NEW JERSEY.

Letters Patent No. 108,478, dated October 18, 1870.

IMPROVEMENT IN ADJUSTABLE HARROWS.

The Schedule referred to in these Letters Patent and making part of the same.

I, ABRAHAM HAVENS, of Trenton, county of Mercer, State of New Jersey, have invented an Improved Adjustable Harrow, of which the following is a specification.

Nature and Object of the Invention.

My invention relates to an improvement in that class of harrows in which the frames consist of several sections jointed together, my improvement consisting of a triangular frame and of three semicircular frames, or sections, provided with ordinary harrow-teeth, and so attached by hinged joints to the triangular frame, and to each other, that they will readily adapt themselves to any unevenness or inequalities of the soil over which the implement is drawn. The hinged joints allow the different parts of the implement to be easily detached from each other, and compactly arranged for convenience in transportation.

Description of the Accompanying Drawing.

Figure 1:
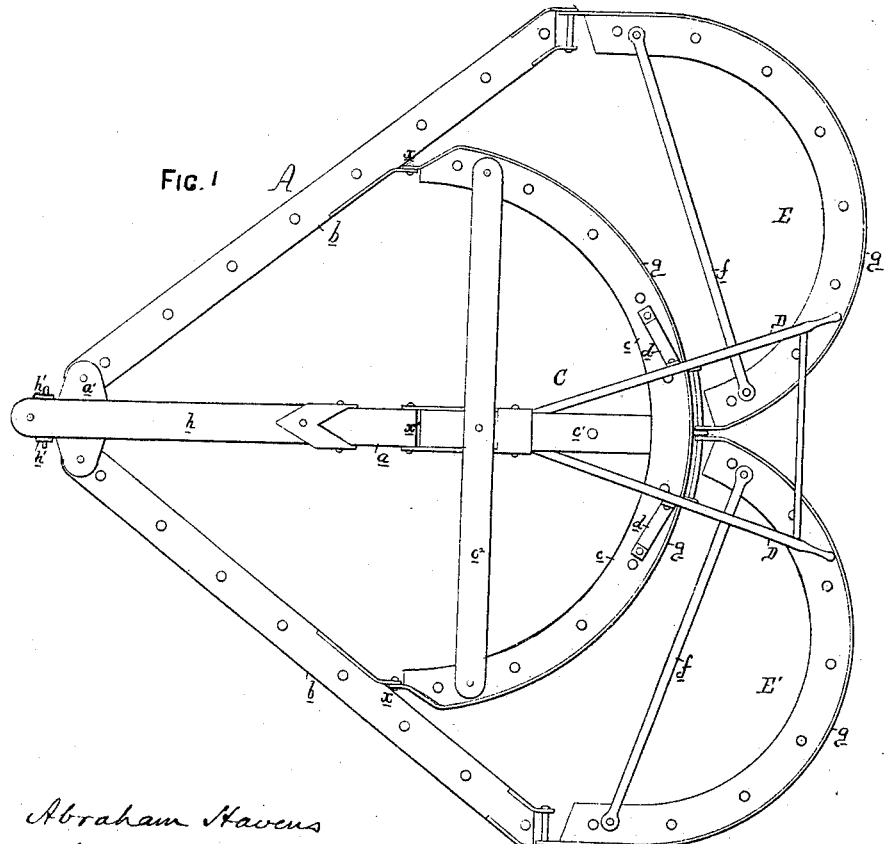
Figure 2:
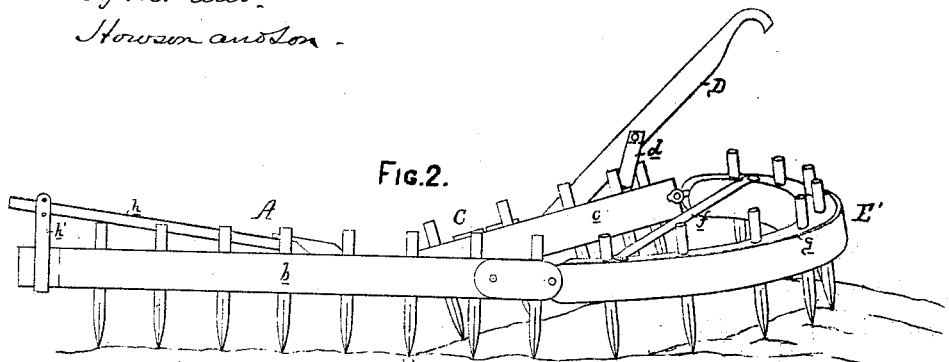
Figure 3:
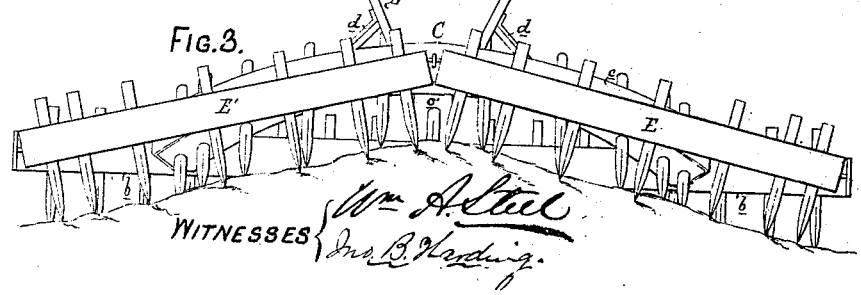

Figure 1 is a plan view of my improved adjustable harrow.
Figure 2, a side elevation of the same, and
Figure 3, a rear view.

General Description.

The triangular frame A of the harrow consists of a bar, $a$, and of two inclined bars, $b\ b$, hinged at their front ends to a plate, $a'$, of the bar $a$.

A frame or section, C, composed of a semicircular or curved bar, $c$, a straight bar, $c^1$, and brace, $c^2$, is hinged to the inner edges of the bars $b\ b$ at the points $x\ x$, and to the inner end of the bar $a$ at the point $x'$.

E and E' are two semicircular frames or sections, hinged to the rear of the frame C, and to the extremities of each of the bars $b$.

These sections are similar to the section C, but are of somewhat smaller size, and they are suitably strengthened by cross-bars or braces, $f\ f$.

The several curved sections are hinged or pivoted to each other, and to the triangular frame, by means of bolts and nuts, or any equivalent devices, which will admit of the said frames or sections being readily detached from each other.

The inclined bars of the triangular frame, and all of the curved sections, are provided with ordinary harrow-teeth, arranged at suitable intervals apart, and in such a manner that no two of the teeth will be on a line with each other.

Handles D D, which are connected together and suitably braced by inclined rods, $d\ d$, are secured to the bar $c^1$ of the inner curved section, and each of the sections E E' may also, if desired, be provided with handles.

Each of the curved sections may be braced by a metal strap, $g$, as shown in the drawing, and these straps may also, if desired, be extended so as to form portions of the hinged joints between the sections.

The horse, or team of horses, by which the harrow is drawn forward, is attached to the front of a bar, $h$, which is hinged to the central bar $a$, and arranged to be raised or lowered, as required, on the vertical rods $h\ h'$.

When the teeth of the harrow become clogged with masses of weeds, earth, &c., the sections may be raised by means of their handles, either separately or together, so as to clear the teeth of such obstructions.

The object of forming the harrow in several sections, constructed and hinged together as above described, is that it can be readily taken apart and packed into a small compass for convenience of transportation, the several sections being arranged within or upon each other, and the hinged bars $b\ b$ being folded in flat against the central bar $a$.

Claim.

The triangular frame A, consisting of a center-piece, $a$, and hinged-toothed bars $b\ b'$, in combination with the curved-toothed sections C E E', all constructed and connected as set forth.

In testimony whereof, I have signed my name to this specification, in the presence of two subscribing witnesses.

ABRAHAM HAVENS.

Witnesses:
ANDREW S. HAVENS,
SAML. EVANS.